US012143854B2

(12) United States Patent
Chen et al.

(10) Patent No.: US 12,143,854 B2
(45) Date of Patent: Nov. 12, 2024

(54) DATA TRANSMISSION METHOD, APPARATUS AND DEVICE

(71) Applicant: Spreadtrum Communications (Shanghai) Co., Ltd., Shanghai (CN)

(72) Inventors: Guochu Chen, Shanghai (CN); Zhongxing Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 265 days.

(21) Appl. No.: 17/572,143

(22) Filed: Jan. 10, 2022

(65) Prior Publication Data

US 2022/0131658 A1 Apr. 28, 2022

Related U.S. Application Data

(63) Continuation of application No. PCT/CN2020/097045, filed on Jun. 19, 2020.

(30) Foreign Application Priority Data

Jul. 8, 2019 (CN) .......................... 201910608818.4

(51) Int. Cl.
*H04L 1/1829* (2023.01)
*H04L 1/22* (2006.01)
(Continued)

(52) U.S. Cl.
CPC ........... *H04W 28/04* (2013.01); *H04L 1/1854* (2013.01); *H04L 1/22* (2013.01); *H04W 4/80* (2018.02);
(Continued)

(58) Field of Classification Search
CPC ............ H04B 7/24–26; H04L 1/08–22; H04L 2001/0092–0098; H04W 4/70–80;
(Continued)

(56) References Cited

U.S. PATENT DOCUMENTS

2011/0103299 A1 5/2011 Shuey
2017/0221072 A1 8/2017 AthuluruTlrumala et al.
(Continued)

FOREIGN PATENT DOCUMENTS

CN 108111194 A 6/2018
CN 108323246 A 7/2018
(Continued)

OTHER PUBLICATIONS

Extended European Search Report for European Patent Application No. 20836162.6, mailed Aug. 4, 2022.
(Continued)

*Primary Examiner* — Timothy J Weidner
(74) *Attorney, Agent, or Firm* — MASCHOFF BRENNAN; Paul G. Johnson

(57) ABSTRACT

Embodiments of the present application provide a data transmission method, apparatus and device, the method includes: sending, by a first device, first indication information to a second device if the first device does not receive a data packet sent by a data source device in a first time slot successfully, where the first device and the second device are configured to receive the data packet sent by the data source device in a same time slot; receiving the data packet sent by the data source device or the second device when the second device receives the data packet sent by the data source device in the first time slot successfully; and receiving the data packet sent by the data source device when the second device does not receive the data packet sent by the data source device in the first time slot successfully. The reliability of data transmission is improved.

18 Claims, 11 Drawing Sheets

(51) Int. Cl.

| | | |
|---|---|---|
| *H04W 4/80* | (2018.01) | |
| *H04W 24/04* | (2009.01) | |
| *H04W 28/02* | (2009.01) | |
| *H04W 28/04* | (2009.01) | |
| *H04W 84/12* | (2009.01) | |
| *H04W 84/20* | (2009.01) | |
| *H04W 88/04* | (2009.01) | |
| *H04W 92/02* | (2009.01) | |
| *H04W 92/10* | (2009.01) | |
| *H04W 92/18* | (2009.01) | |

(52) U.S. Cl.
CPC ....... *H04W 24/04* (2013.01); *H04W 28/0273* (2013.01); *H04W 84/12* (2013.01); *H04W 84/20* (2013.01); *H04W 88/04* (2013.01); *H04W 92/02* (2013.01); *H04W 92/10* (2013.01); *H04W 92/18* (2013.01)

(58) Field of Classification Search
CPC ..... H04W 24/02–10; H04W 28/02–26; H04W 84/005–22; H04W 88/02–12; H04W 92/02–04; H04W 92/08–10; H04W 92/16–18
See application file for complete search history.

(56) References Cited

U.S. PATENT DOCUMENTS

| | | | | |
|---|---|---|---|---|
| 2018/0084456 A1* | 3/2018 | Gostev | ................. | H04W 28/04 |
| 2018/0084606 A1 | 3/2018 | Li et al. | | |
| 2018/0184234 A1* | 6/2018 | Chen | ................. | H04W 4/80 |
| 2020/0359134 A1* | 11/2020 | Tong | ................. | H04W 4/80 |

FOREIGN PATENT DOCUMENTS

| | | |
|---|---|---|
| CN | 108337074 A | 7/2018 |
| CN | 109547992 A | 3/2019 |
| CN | 109561419 A | 4/2019 |
| CN | 109660971 A | 4/2019 |
| CN | 109769232 A | 5/2019 |
| CN | 109905925 A | 6/2019 |
| CN | 110266444 A | 9/2019 |
| JP | 2007266876 A | 10/2007 |

OTHER PUBLICATIONS

The first Office Action issued by the Japanese Patent Office dated Jan. 5, 2023 for the Japanese Patent Application No. 2022-500992.
International Search Report for PCT Application No. PCT/CN2020/097045 mailed Aug. 28, 2020.
The first Office Action issued by the China National Intellectual Property Administration (CNIPA) dated Apr. 2, 2021 for the Chinese Patent Application No. 201910608818.4.
The second Office Action issued by the China National Intellectual Property Administration (CNIPA) dated Nov. 30, 2021 for the Chinese Patent Application No. 201910608818.4.
Korean Office Action, as issued in connection with Korean Application No. 10-2022-7001246, dated Sep. 23, 2024, 11 pgs.

* cited by examiner

DATA TRANSMISSION METHOD, APPARATUS AND DEVICE

CROSS-REFERENCE TO RELATED APPLICATIONS

This application is a continuation of International Application No. PCT/CN2020/097045, filed on Jun. 19, 2020, which claims priority to Chinese Patent Application No. 2019106088184, entitled "DATA TRANSMISSION METHOD, APPARATUS AND DEVICE", filed on Jul. 8, 2019; both of the above applications are hereby incorporated by reference in their entireties.

TECHNICAL FIELD

Embodiments of the present application relate to the field of electronic technology, and in particular, to a data transmission method, apparatus and device.

BACKGROUND

In a data transceiving system of a wireless device, data exchange between a data source device and different forms of wireless transceiving devices can be realized.

At present, with the increase in user demands, the wireless transceiving device connected to the data source device has gradually shifted from a single wireless transceiving device to a dual-wireless transceiving device or even a multi-wireless transceiving device. In many application scenarios, data from the data source device needs to be transmitted to multiple wireless transceiving devices. For example, a mobile phone needs to transmit audio to two Bluetooth headsets. When the data from the data source device needs to be transmitted to multiple wireless transceiving devices, the data source device may send a data packet to the multiple wireless transceiving devices respectively. In order to improve the reliability of data transmission, the data source device may also retransmit data packets to the wireless transceiving device for N times (N is a preset integer). However, if the wireless transceiving device still does not receive the data packet after the data source device has retransmitted the data packets for N times, the wireless transceiving device cannot receive the data packet successfully, thus resulting in low reliability of data transmission.

SUMMARY

Embodiments of the present application provide a data transmission method, apparatus and device, which improves the reliability of data transmission.

In a first aspect, an embodiment of the present application provides a data transmission method, including:
sending, by a first device, first indication information to a second device if the first device does not receive a data packet sent by a data source device in a first time slot successfully, where the first device and the second device are configured to receive the data packet sent by the data source device in a same time slot;
receiving, by a first device, the data packet sent by the data source device or the second device when the second device receives the data packet sent by the data source device in the first time slot successfully; and
receiving, by a first device, the data packet sent by the data source device when the second device does not receive the data packet sent by the data source device in the first time slot successfully.

In a possible implementation, the receiving, by the first device, the data packet sent by the data source device or the second device when the second device receives the data packet sent by the data source device in the first time slot successfully, includes:
receiving, by the first device, the data packet sent by the second device if the first time slot is a time slot in which the data source device retransmits the data packet for the last time; and
receiving, by the first device, the data packet sent by the data source device or the second device if the first time slot is before the time slot in which the data source device retransmits the data packet for the last time.

In a possible implementation, the receiving, by the first device, the data packet sent by the data source device or the second device if the first time slot is before the time slot in which the data source device retransmits the data packet for the last time, includes:
after the first device does not receive the data packet sent by the data source device in first time slot successfully, receiving, by the first device, the data packet sent by the data source device if the first device sends a failure response message to the data source device; where the failure response message is used to indicate that the first device does not receive the data packet successfully; and
after the first device does not receive the data packet sent by the data source device in first time slot successfully, receiving, by the first device, the data packet sent by the second device if the first device or the second device sends a success response message to the data source device; where the success response message is used to indicate that at least one of the first device and the second device receives the data packet successfully.

In a possible implementation, the receiving, by a first device, the data packet sent by the data source device when the second device does not receive the data packet sent by the data source device in the first time slot successfully, includes:
receiving, by the first device, the data packet sent by the data source device if the first time slot is before a time slot in which the data source device retransmits the data packet for the last time.

In a possible implementation, the receiving, by the first device, the data packet sent by the data source device, includes:
setting, by the first device, a device state to a first state, where the first state is used to indicate that the first device communicates with the data source device; and
receiving, by the first device, the data packet sent by the data source device according to the first state.

In a possible implementation, the setting, by the first device, a device state to the first state, includes:
setting, by the first device, a communication address of the first device to an address of a device group, where the device group is a device group in which the first device and the second device are located.

In a possible implementation, the receiving, by the first device, the data packet sent by the second device, includes:
setting, by the first device, a device state to a second state, where the second state is used to indicate that the first device communicates with the second device; and
receiving, by the first device, the data packet sent by the second device according to the second state.

In a possible implementation, the setting, by the first device, a device state to the second state, includes:

setting, by the first device, a communication address of the first device to a physical address of the first device.

In a possible implementation, if the first device receives the data packet sent by the data source device in a first time slot successfully, and the second device does not receive the data packet sent by the data source in the first time slot successfully; the method further includes:
  receiving, by the first device, second indication information sent by the second device;
  sending, by the first device, the data packet to the second device if the first time slot is a time slot in which the data source device retransmits the data packet for the last time; and
  sending, by the first device, the data packet to the second device if the first time slot is before the time slot in which the data source device retransmits the data packet for the last time, and the first device or the second device sends a success response message to the data source device; where the success response message is used to indicate that at least one of the first device and the second device receives the data packet successfully.

In a possible implementation, the sending, by a first device, first indication information to a second device, includes:
  sending, by the first device, the first indication information to the second device in a preset idle time period in a second time slot, where the second time slot is a time slot after the first time slot and next to the first time slot.

In a possible implementation, the second time slot further includes a first time period, the preset idle time period is after the first time period, and the first time period is a time period for sending a response message to the data source device.

In a possible implementation, the first device and the second device are wireless transceiving devices.

In a possible implementation, the wireless transceiving device is a Bluetooth device.

In a possible implementation, the Bluetooth device is a Bluetooth audio device.

In a possible implementation, the Bluetooth audio device is a Bluetooth headset or a Bluetooth speaker.

In a second aspect, an embodiment of the present application provides a data transmission apparatus, which is applied to a first device, the data transmission apparatus includes a sending module and a receiving module, where,
  the sending module is configured to send first indication information to a second device if the receiving module does not receive a data packet sent by a data source device in a first time slot successfully, where the first device and the second device are configured to receive the data packet sent by the data source device in a same time slot;
  the receiving module is configured to receive the data packet sent by the data source device or the second device when the second device receives the data packet sent by the data source device in the first time slot successfully;
  the receiving module is further configured to receive the data packet sent by the data source device when the second device does not receive the data packet sent by the data source device in the first time slot successfully.

In a possible implementation, the receiving module is specifically configured to:
  receive the data packet sent by the second device if the first time slot is a time slot in which the data source device retransmits the data packet for the last time; and
  receive the data packet sent by the data source device or the second device if the first time slot is before the time slot in which the data source device retransmits the data packet for the last time.

In a possible implementation, the receiving module is specifically configured to:
  after the first device does not receive the data packet sent by the data source device in first time slot successfully, receive the data packet sent by the data source device if the first device sends a failure response message to the data source device; where the failure response message is used to indicate that the first device does not receive the data packet successfully; and
  after the first device does not receive the data packet sent by the data source device in first time slot successfully, receive the data packet sent by the second device if the first device or the second device sends a success response message to the data source device; where the success response message is used to indicate that at least one of the first device and the second device receives the data packet successfully.

In a possible implementation, the receiving module is specifically configured to:
  receive the data packet sent by the data source device if the first time slot is before a time slot in which the data source device retransmits the data packet for the last time.

In a possible implementation, the apparatus further include a setting module, where,
  the setting module is configured to set a device state of the first device to a first state, where the first state is used to indicate that the first device communicates with the data source device;
  the receiving module is specifically configured to receive the data packet sent by the data source device according to the first state.

In a possible implementation, the setting module is specifically configured to:
  set a communication address of the first device to an address of a device group, where the device group is a device group in which the first device and the second device are located.

In a possible implementation, the setting module is further configured to set the device state to a second state, where the second state is used to indicate that the first device communicates with the second device;
  the receiving module is specifically configured to receive the data packet sent by the second device according to the second state.

In a possible implementation, the setting module is specifically configured to:
  set a communication address of the first device to a physical address of the first device.

In a possible implementation, the receiving module is further configured to receive second indication information sent by the second device if the receiving module receives the data packet sent by the data source device in a first time slot successfully, and the second device does not receive the data packet sent by the data source device in the first time slot successfully;
  the sending module is further configured to send the data packet to the second device if the first time slot is a time slot in which the data source device retransmits the data packet for the last time;
  the sending module is further configured to send the data packet to the second device if the first time slot is before the time slot in which the data source device retransmits the data packet for the last time, and the sending module or the second device sends a success response message to the data source device; where the success response message is used to indicate that at least one of the first device and the second device receives the data packet successfully.

In a possible implementation, the sending module is specifically configured to:

send the first indication information to the second device in a preset idle time period in a second time slot, where the second time slot is a time slot after the first time slot and next to the first time slot.

In a possible implementation, the second time slot further includes a first time period, the preset idle time period is after the first time period, and the first time period is a time period for sending a response message to the data source device.

In a possible implementation, the first device and the second device are wireless transceiving devices.

In a possible implementation, the wireless transceiving device is a Bluetooth device.

In a possible implementation, the Bluetooth device is a Bluetooth audio device.

In a possible implementation, the Bluetooth audio device is a Bluetooth headset or a Bluetooth speaker.

In a third aspect, an embodiment of the present application provides a data transmission apparatus, including: a memory and a processor; where the processor executes program instructions in the memory for implementing the data transmission method according to any one of the first aspect.

In a forth aspect, an embodiment of the present application provides a computer-readable storage medium, including: a computer program stored thereon, where when the computer program is executed by a processor, the data transmission method according to any one of the first aspect is implemented.

In the data transmission method, apparatus and device provided in the present application, a first device sends first indication information to a second device if the first device does not receive a data packet sent by a data source device in a first time slot successfully, where the first indication information is used to indicate that the first device does not receive the data packet successfully; the second device or the data source device may send the data packet to the first device if the second device receives the data packet in the first time slot successfully; the data source device may send the data packet to the first device if the second device also does not receive the data packet in the first time slot successfully. In the above processes, if the first device does not receive the data packet in the first time slot successfully, the first device may acquire the data packet from the second device or the data source device, which improves the success probability of the first device to acquire the data packet, thereby improving the reliability of data transmission.

BRIEF DESCRIPTION OF DRAWINGS

In order to explain the technical solutions in the embodiments of the present application or the prior art more clearly, the following will briefly introduce the drawings that need to be used in the description of the embodiments or the prior art. Obviously, the drawings in the following description are some embodiments of the present application. For those of ordinary skill in the art, other drawings can be obtained based on these drawings without creative work.

DESCRIPTION OF EMBODIMENTS

In order to make the objectives, technical solutions, and advantages of the embodiments of the present application clearer, the technical solutions in the embodiments of the present application will be described clearly and completely in conjunction with the accompanying drawings in the embodiments of the present application. Obviously, the described embodiments are a part of the embodiments of the present application, but not all of the embodiments. Based on the embodiments of the present application, all other embodiments obtained by those of ordinary skill in the art without creative work will fall within the protection scope of the present application.

Figure 1:
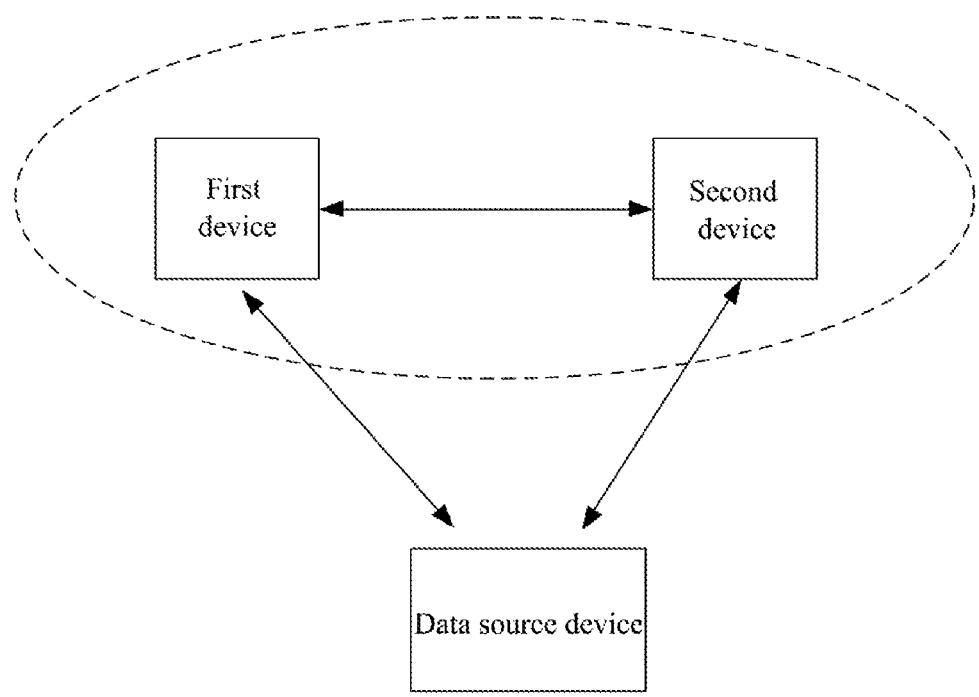
FIG. 1 is an architecture diagram of a communication system provided by an embodiment of the present application.

FIG. 1 is an architecture diagram of a communication system provided by an embodiment of the present application. Please refer to FIG. 1, a first device, a second device, and a data source device are included. The first device and the second device may communicate with each other, and the data source device may communicate with the first device and the second device respectively. The data source device is configured to send a data packet to the first device and the second device. For example, the data source device may send a data packet to the first device and the second device simultaneously.

Figure 2:
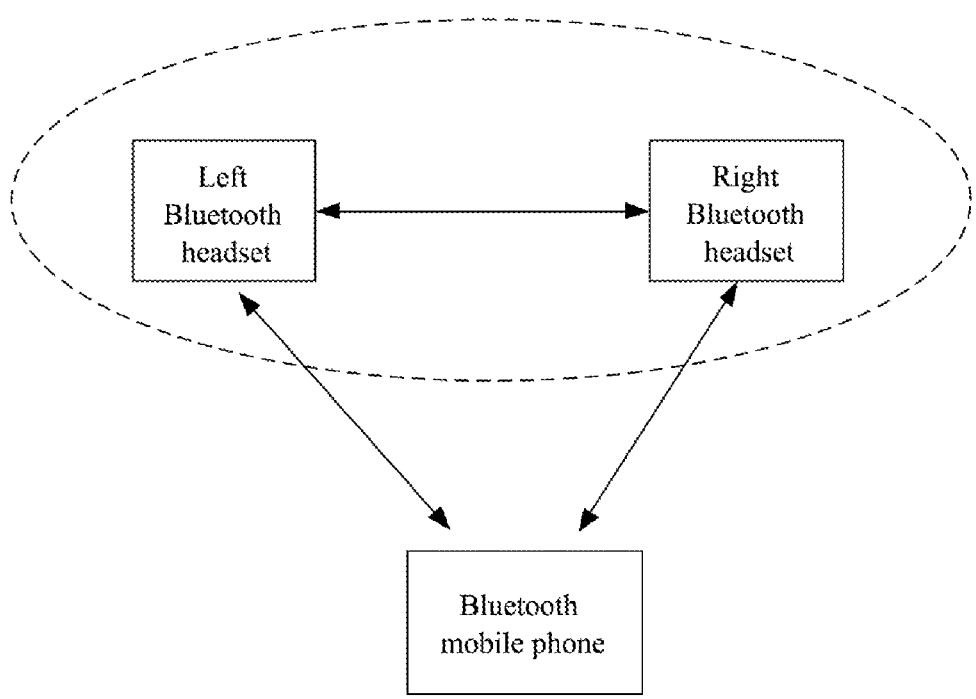
FIG. 2 is a schematic diagram of an application scenario provided by an embodiment of the present application.

FIG. 2 is a schematic diagram of an application scenario provided by an embodiment of the present application. Please refer to FIG. 2, a left Bluetooth headset, a right Bluetooth headset and a Bluetooth mobile are included. The left Bluetooth headset and the right Bluetooth headset may communicate with each other, and the Bluetooth mobile phone may communicate with the left Bluetooth headset and the right Bluetooth headset respectively. The Bluetooth mobile phone may provide audio data packet to the left Bluetooth headset and the right Bluetooth headset to cause the left Bluetooth headset and the right Bluetooth headset to play audio data. For example, the Bluetooth mobile phone may send audio data packet to the left Bluetooth headset and the right Bluetooth headset simultaneously.

Figure 3:
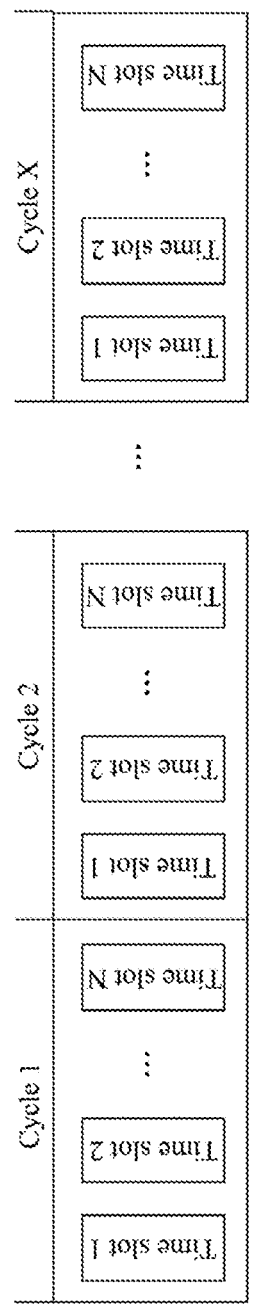
FIG. 3 is a schematic diagram of process of transceiving a data packet provided by an embodiment of the present application.

For ease of understanding, first, the process of transceiving a data packet between the data source device and the first device and the second device will be described with reference to FIG. 3. FIG. 3 is a schematic diagram of process of transceiving a data packet provided by an embodiment of the present application. Please refer to FIG. 3, the data source device sends a data packet to the first device and the second device periodically, and correspondingly, the first device and the second device receive the data packet sent by the data source device periodically. In one cycle, the data source device may send one or more data packet to the first device and the second device. A transmission duration of a data packet is at most one cycle. If the first device and the second device do not receive the data packet within one cycle successfully, the data packet transmission fails. In the same time slot, the data source device is configured to send a data packet, the first device and the second device are configured to receive the data packet, or, in the same time slot, the data source device is configured to receive a response message, and the first device and the second device are configured to send the response message. Each cycle includes multiple time slots. In an embodiment, a duration of each cycle may be same or different, and durations of different time slots may be same or different.

Figure 4:
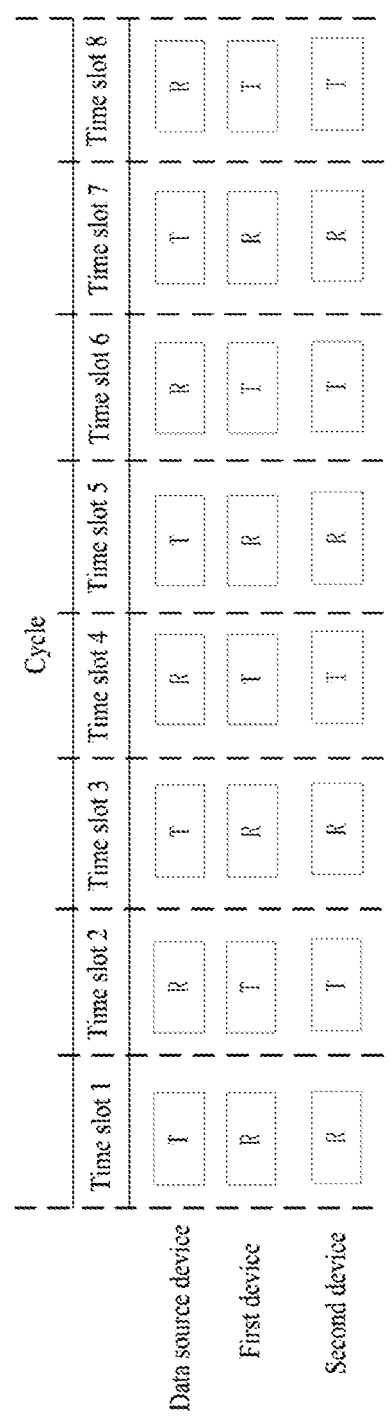
FIG. 4 is a schematic diagram of a time slot provided by an embodiment of the present application.

In the following, the process of transceiving the data packet in any cycle will be described with reference to FIG. 4. FIG. 4 is a schematic diagram of a time slot provided by an embodiment of the present application. Please refer to FIG. 4, 8 time slots being included in one cycle is taken as an example for description. In the following, meanings of characters in FIG. 4 will be explained by Table 1:

It should be noted that FIG. 4 just illustrates the process of transceiving the data packet in the form of an example, which is not a limitation for the transceiving process. For example, the number of time slots included in one cycle may also be other numbers, and the data source device, the first device, and the second device may be idle in some time slots, and so on.

The first device and the second device may send the response message to the data source device through at least the following two feasible implementation manners.

One feasible implementation manner is that: the first device and the second device send response messages to the data source device respectively.

If the first device receives the data packet successfully, the first device sends a success response message to the data source device, and if the first device does not receive the data packet successfully, the first device sends a failure response message to the data source device.

If the second device receives the data packet successfully, the second device sends a success response message to the data source device, and if the second device does not receive the data packet successfully, the second device sends a failure response message to the data source device.

In the feasible implementation manner, in one time slot, the data source device may receive the response message sent by the first device and the response message sent by the second device.

Another feasible implementation manner is that: one of the first device and the second device sends a response message to the data source device.

In an embodiment, a master device and a slave device may be set in the first device and the second device, the slave device may send a response message to the master device, and the master device determines a response message sent to the data source device according to a response message sent by the slave device and whether the master device receives the data packet sent by the data source device successfully.

TABLE 1

| Line | Character | Meaning |
| --- | --- | --- |
| Line of the data source device | T | The data source device sends a data packet to the first device and the second device |
| | R | The data source device receives the response message sent by the first device and/or the second device |
| Line of the first device | T | The first device receives the data packet sent by the data source device |
| | R | The first device sends a response message to the data source device |
| Line of the second device | T | The second device receives the data packet sent by the data source device |
| | R | The second device sends a response message to the data source device |

In multiple time slots of a cycle, the data source device, the first device, and the second device receive data and send data alternately. For example, in time slot 1, time slot 3, time slot 5, and time slot 7, the data source device sends the data packet to the first device and the second device, and the first device and the second device receive the data packet from the data source device. In time slot 2, time slot 4, time slot 6 and time slot 8, the first device and the second device send the response message (a success response message or a failure response message) to the data source device, and the data source device receives the response message from the first device and the second device.

For example, if one of the first device and the second device receives the data packet successfully, the master device sends a success response message to the data source device. If neither of the first device and the second device receives the data packet successfully, the master device sends a failure response message to the data source device.

In the feasible implementation manner, in one time slot, the data source device may receive the response message sent by one device.

After the data source sends the data packet to the first device and the second device, the data source device may also retransmit the data packet. A retransmission maximum number of the data source device (a maximum number of retransmissions of data packet) may be set. When the number of retransmissions of the data packet by the data source device is less than the retransmission maximum number, the data source device may retransmit the data packet according to the received response message. In an embodiment, after the data source device sends a data packet to the first device and the second device, if the data source device receives a failure response message, the data source device retransmits the data packet to the first device and the second device.

In the present application, in the process of data transmission, a first device sends first indication information to a second device if the first device does not receive a data packet sent by a data source device in a first time slot successfully, where the first indication information is used to indicate that the first device does not receive the data packet successfully; the second device or the data source device may send the data packet to the first device if the second device receives the data packet in the first time slot successfully; the data source device may send the data packet to the first device if the second device also does not receive the data packet in the first time slot successfully. In the above processes, if the first device does not receive the data packet in the first time slot successfully, the first device may acquire the data packet from the second device or the data source device, which improves the success probability of the first device to acquire the data packet, thereby improving the reliability of data transmission.

In the following, the technical solutions shown in the present application will be described in detail through specific embodiments. It should be noted that the following specific embodiments can be combined with each other, and the same or similar content will not be repeated in different embodiments.

Figure 5:
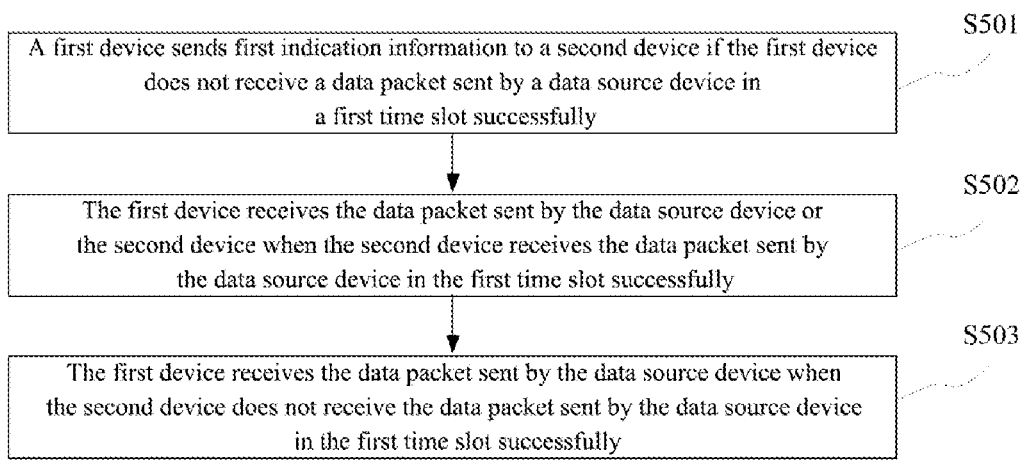
FIG. 5 is a schematic flowchart of a data transmission method provided by an embodiment of the present application.

FIG. 5 is a schematic flowchart of a data transmission method provided by an embodiment of the present application. Please refer to FIG. 5, the method may include:

S501: a first device sends first indication information to a second device if the first device does not receive a data packet sent by a data source device in a first time slot successfully.

The first device and the second device are configured to receive the data packet sent by the data source device in the same time slot.

In an embodiment, the first device and the second device are wireless transceiving devices. The wireless transceiving device may be a Bluetooth device. The Bluetooth device may be a Bluetooth audio device. For example, the Bluetooth audio device is a Bluetooth headset or a Bluetooth speaker.

In an embodiment, the first time slot is any time slot in a transmission cycle. In the first time slot, the data source device sends a data packet to the first device and the second device simultaneously. For example, when the first device and the second device are Bluetooth headsets, the data packet may be an audio data packet.

In an embodiment, the first device may send the first indication information to the second device in a preset idle time period in a second time slot, and the second time slot is a time slot after the first time slot and adjacent to the first time slot. That is, the second time slot is a time slot behind the first time slot.

The second time slot also includes a first time period, the preset idle time period is after the first time period, and the first time period is a time period for sending a response message to the data source device.

In the embodiment of the present application, an indication information receiving period or an indication information sending period is configured in the transmission time slot corresponding to the first device and the second device. For example, if the first device receives the data packet sent by the data source device in the first time slot successfully, the preset idle time period in the second time slot is configured as the indication information receiving period of the first device, that is, in the preset idle time period, the first device is configured to receive second indication information sent by the second device. If the first device does not receive the data packet sent by the data source device in the first time slot successfully, the preset idle time period in the second time slot is configured as the indication information sending period of the first device, that is, in the preset idle time period, the first device is configured to send the first indication information to the second device. It should be noted that the process of configuring an indication information receiving period or an indication information sending period in a transmission time slot corresponding to the second device is the same as the process of configuring the indication information receiving period or the indication information sending period in the transmission time slot corresponding to the first device, which will not be repeated here.

In the following, the process of sending instruction information will be described with reference to FIG. 6.

Figure 6:
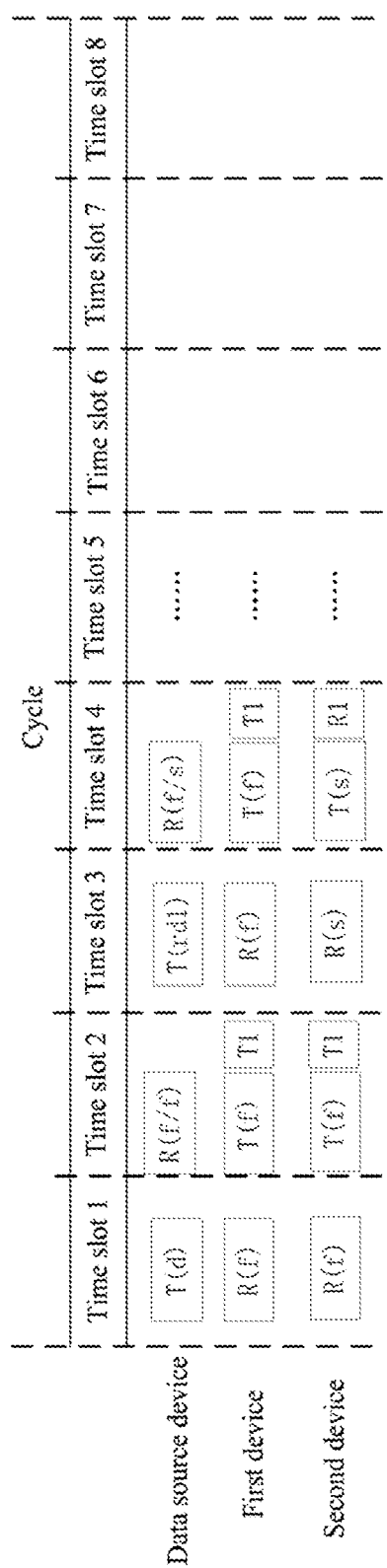
FIG. 6 is a schematic diagram of another time slot provided by an embodiment of the present application.

FIG. 6 is a schematic diagram of another time slot provided by an embodiment of the present application. In the following, meanings of characters that may exist in FIG. 6 will be explained by Table 2:

TABLE 2

| Line | Character | Meaning |
| --- | --- | --- |
| Line of the data source device | T(d) | The data source device sends a data packet to the first device and the second device |
| | T(rd1) | The data source device retransmits the data packet to the first device and the second device for the first time |
| | R(f/f) | The data source device receives two failure response messages |
| | R(f/s) | The data source device receives a failure response message and a success response message |
| | R(s/s) | The data source device receives two success response messages |
| | R(f) | The data source device receives a failure response message |
| | R(s) | The data source device receives a success response message |

TABLE 2-continued

| Line | Character | Meaning |
| --- | --- | --- |
| Line of the first device | R(f) | The first device fails to receive the data packet sent by the data source device |
| | R(s) | The first device receives the data packet sent by the data source device successfully |
| | T(f) | The first device sends a failure response message to the data source device |
| | T(s) | The first device sends a success response message to the data source device |
| | T1 | The first device sends first indication information to the second device |
| | R1 | The first device receives second indication information sent by the second device |
| Line of the second device | R(f) | The second device fails to receive the data packet sent by the data source device |
| | R(s) | The second device receives the data packet sent by the data source device successfully |
| | T(f) | The second device sends a failure response message to the data source device |
| | T(s) | The second device sends a success response message to the data source device |
| | T1 | The second device sends second indication information to the first device |
| | R1 | The second device receives first indication information sent by the first device |

It should be noted that FIG. 6 just illustrates some of the characters in Table 2 in the form of an example. Of course, in other examples, any of the above-mentioned characters may appear in FIG. 6.

Please refer to FIG. 6, assuming that the first device does not receive the data packet sent by the data source device in time slot 3 successfully, the preset idle time period T1 in time slot 4 is configured as the indication information sending period of the first device, that is, the first device may send the first indication information to the second device during the preset idle time period T1. Assuming that the second device receives the data packet sent by the data source device in time slot 3 successfully, the preset idle time period R1 in time slot 4 is configured as the indication information receiving period of the second device, that is, the second device may receive the first indication information sent by the first device in the preset idle time period R1.

It should be noted that if the first device and the second device send indication information in the preset idle time period of the same time slot simultaneously (for example, the first device sends the first indication information, and the second device sends the second indication information), then neither of the two devices can receive the indication information sent by each other. For example, referring to time slot 2 in FIG. 6, the preset idle time period T1 in time slot 2. For the first device, because the preset idle time period is configured as the sending period, that is, in the preset idle time period T1, the first device only sends data, but does not receive data, the first device, therefore, cannot receive the second indication information sent by the second device in the preset idle time period. For the second device, because the preset idle time period is configured as the sending period, that is, in the preset idle time period T1, the second device only sends data, but does not receive data, the second device, therefore, cannot receive the first indication information sent by the first device in the preset idle time period.

In an embodiment, after the first device sends the first indication information to the second device, the second device may receive the first indication information successfully, or may not receive the first indication information. For example, if the second device does not receive the data packet sent by the data source device in the first time slot, the second device cannot receive the first indication information sent by the first device. If the second device receives the data packet sent by the data source device in the first time slot, the second device may receive the first indication information sent by the first device.

S502: the first device receives the data packet sent by the data source device or the second device when the second device receives the data packet sent by the data source device in the first time slot successfully.

In an embodiment, if the first time slot is a time slot in which the data source device retransmits the data packet for the last time, the first device receives the data packet sent by the second device. That is, the number of retransmissions of the data source device reaches the maximum retransmission number, and then the second device sends the data packet to the first device.

In an embodiment, if the first time slot is before the time slot in which the data source device retransmits the data packet for the last time, the first device receives the data packet sent by the data source device or the second device. That is, the number of retransmissions of the data source device reaches the maximum retransmission number. Therefore, the second device or the data source device may send the data packet to the first device.

In an embodiment, a device state of the first device may include a first state and a second state. When the device state of the first device is the first state, the first device is configured to communicate with the data source device. When the device state of the first device is the second state, the first device is configured to communicate with the second device.

For example, when the device state of the first device is the first state, the first device is configured to receive and/or send data on a frequency corresponding to the data source device, so as to implement communication between the first device and the data source device. When the device state of the first device is the second state, the first device is configured to receive and/or send data on a frequency corresponding to the second device, so as to implement communication between the first device and the second device.

In an embodiment, a communication address of the first device may be changed, so as to change the device state of the first device. The communication address of the first device may be set to an address of a device group in which the first device and the second device are located, so as to set the device state of the first device to the first state. In an embodiment, the address of the device group in which the first device and the second device are located may be an identifier of the device group, and an identifier of a device group may identify a device group uniquely. The identifier of the device group may be determined according to a preset addressing rule. For example, the preset addressing rule may indicate at least one of format and length of the identifier of the device group. The communication address of the first device may be set to a physical address of the first device, so as to set the device state of the first device to the second state. The physical address of the first device may be internet protocol (IP) address, medium access control (MAC) address, Bluetooth address, etc. of the first device.

In an embodiment, a preset flag bit in the first device may also be changed, so as to change the device state of the first device. For example, when the preset flag bit is set to a first flag bit, the device state of the first device is set to the first state, and when the preset flag bit is set to a second flag bit, the device state of the first device is set to the second state.

In an embodiment, before the first device communicates with the data source device, the first device first sets the device state of the first device to the first state. Before the first device communicates with the second device, the first device first sets the device state of the first device to the second state.

In an embodiment, the device state of the second device may include a first state and a second state. When the device state of the second device is the first state, the second device is configured to communicate with the data source device. When the device state of the second device is the second state, the second device is configured to communicate with the first device.

It should be noted that the method for setting the device state of the second device is the same as the method for setting the device state of the first device, which will not be repeated here.

S503: the first device receives the data packet sent by the data source device when the second device does not receive the data packet sent by the data source device in the first time slot successfully.

In an embodiment, if the first time slot is before the time slot in which the data source device retransmits the data packet for the last time, the first device receives the data packet sent by the data source device. That is, the number of retransmissions of the data source device reaches the maximum retransmission number. Therefore, the data source device may send the data packet to the first device.

In an embodiment, if the first time slot is the time slot in which the data source device retransmits the data packet for the last time, the first device fails to receive the data packet. That is, the number of retransmissions of the data source device reaches the maximum retransmission number, and the data source device cannot retransmit the data packet to the first device. Therefore, the first device fails to receive the data packet.

In the data transmission method provided by the embodiment of the present application, a first device sends first indication information to a second device if the first device does not receive a data packet sent by a data source device in a first time slot successfully, where the first indication information is used to indicate that the first device does not receive the data packet successfully; the second device or the data source device may send the data packet to the first device if the second device receives the data packet in the first time slot successfully; the data source device may send the data packet to the first device if the second device also does not receive the data packet in the first time slot successfully. In the above processes, if the first device does not receive the data packet in the first time slot successfully, the first device may acquire the data packet from the second device or the data source device, which improves the success probability of the first device to acquire the data packet, thereby improving the reliability of data transmission.

On the basis of any of the foregoing embodiments, in an embodiment, when the first device and the second device send response messages to the data source device in different ways, the data packet transmission methods may be different. In the following, description will be given with reference to FIG. 7-FIG. 8.

One feasible implementation manner is that: the first device and the second device send response messages to the data source device respectively.

In the feasible implementation manner, when one of the first device and the second device does not receive the data packet sent by the data source device successfully, if the number of retransmissions of the data source device is less than the maximum retransmission number, the data source device retransmits the data packet to the first device and the second device. If the number of retransmissions of the data source device reaches the maximum retransmission number, the data packet is retransmitted between the first device and the second device.

In following, the feasible implementation manner will be described with reference to FIG. 7-FIG. 8. In the embodiments shown in FIG. 7-FIG. 8, taking the maximum retransmission number of the data source device being 1 as an example for description.

Figure 7:
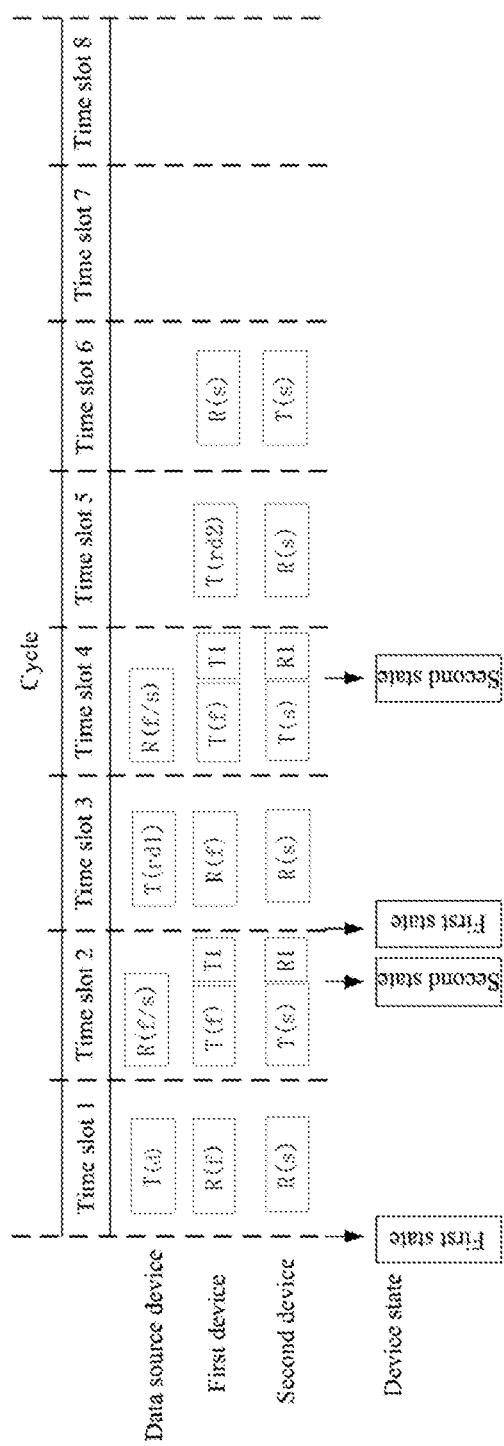
FIG. 7 is a schematic diagram of yet another time slot provided by an embodiment of the present application.

FIG. 7 is a schematic diagram of yet another time slot provided by an embodiment of the present application. The meaning of each character in FIG. 7 can be referred to Table 2, which will not be repeated here.

Figure 8:
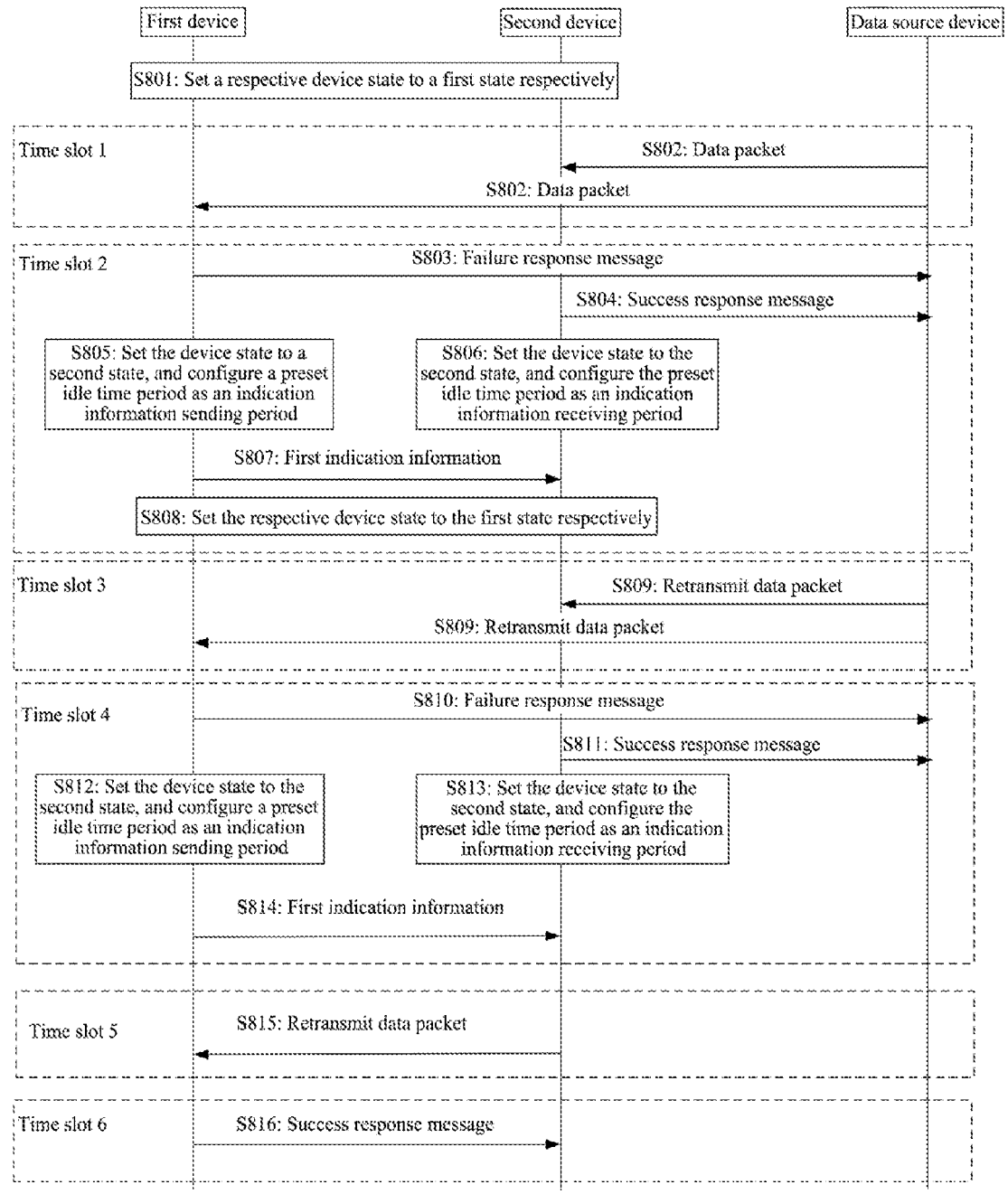
FIG. 8 is a schematic flowchart of another data transmission method provided by an embodiment of the present application.

FIG. 8 is a schematic flowchart of another data transmission method provided by an embodiment of the present application. Please refer to FIG. 8, the method may include:

S801: a first device and a second device respectively set a respective device state to a first state before a time slot 1.

After the first device sets the device state to the first state, the first device communicates with the data source device. After the second device sets the device state to the first state, the second device communicates with the data source device.

S802: a data source device sends a data packet to the first device and the second device in the time slot 1.

In an embodiment, the first device may receive the data packet successfully, or may not receive the data packet successfully. The second device may receive the data packet successfully, or may not receive the data packet successfully. In the following, taking a case where the first device does not receive the data packet successfully and the second device receives the data packet successfully as an example.

S803: the first device sends a failure response message to the data source device in a first time period in a time slot 2.

S804: the second device sends a success response message to the data source device in the first time period in the time slot 2.

S805: the first device sets the device state to a second state, and configures a preset idle time period in the time slot 2 as an indication information sending period.

After the first device sets the device state to the second state, the first device communicates with the second device.

S806: the second device sets the device state to the second state, and configures the preset idle time period in time slot 2 as an indication information receiving period.

After the second device sets the device state to the second state, the second device communicates with the first device.

S807: the first device sends first indication information to the second device in the preset idle time period in the time slot 2.

S808: the first device and the second device set the respective device state to the first state.

Since the time slot 2 is before a time slot (a time slot 3) in which the data source device retransmits the data packet for the last time, the first device and the second device still need to communicate with the data source device, and the first device and the second device set the respective device state to the first state.

After the second device receives the first indication information sent by the first device, since the device state of the second device is set to the first state, the second device still needs to communicate with the data source device, and the second device does not response to the received first instruction information, that is, the second device does not retransmit the data packet to the first device. In this way, it can prevent the second device and the data source device from retransmitting the data packet to the first device simultaneously in the time slot 3, which further avoids interference when the first device receives the data packet in the time slot 3.

It should be noted that the execution of S808 may be in the time slot 2 or in the time slot 3.

S809. The data source device retransmits the data packet to the first device and the second device in the time slot 3.

Since the data source device receives the failure response message sent by the first device, the data source device retransmits the data packet to the first device and the second device.

In an embodiment, after the data source device retransmits the data packet to the first device and the second device, the first device may receive the data packet successfully, or may not receive the data packet successfully. The second device still receives the data packet successfully. In the following, taking a case where the first device still does not receive the data packet successfully and the second device still receives the data packet successfully as an example for description.

S810: the first device sends a failure response message to the data source device in a first period in a time slot 4.

S811: the second device sends a success response message to the data source device in the first time period in the time slot 4.

S812: the first device sets the device state to the second state, and configures a preset idle time period in the time slot 4 as the indication information sending period.

After the first device sets the device state to the second state, the first device communicates with the second device.

S813: the second device sets the device state to the second state, and configures the preset idle time period in the time slot 4 as the indication information receiving period.

After the second device sets the device state to the second state, the second device communicates with the first device.

In the preset idle time period in time slot 4, the second device may receive the first indication information sent by the first device.

S814: the first device sends the first indication information to the second device in the preset idle time period in the time slot 4.

Since the time slot 4 is after the time slot (the time slot 3) in which the data source device retransmits the data packet for the last time, the data source device will not retransmit the data packet to the first device and the second device. Therefore, the device state of the first device continues to remain in the second state.

Since the time slot 4 is after the time slot (the time slot 3) in which the data source device retransmits the data packet for the last time, the data source device will not retransmit the data packet to the first device and the second device. Therefore, the device state of the second device continues to remain in the second state.

S815: the second device sends the data packet to the first device in a time slot 5.

S816: the first device sends a success response message to the second device in a time slot 6.

In the embodiment shown in FIG. 7-FIG. 8, the communication objects of the first device and the second device may be controlled by the device state. When the number of retransmissions of the data source device does not reach the maximum retransmission number, the data source device may retransmit the data packet to the first device and the second device; when the number of retransmissions of the data source device reaches the maximum retransmission number, the first device and the second device may retransmit the data packet to each other, which improves the success probability of the first device and the second device to acquire data packets, thereby improving the reliability of data transmission.

One feasible implementation manner is that: one of the first device and the second device sends a response message to the data source device.

In the feasible implementation manner, when one of the first device and the second device receives the data packet sent by the data source device successfully, the data source device no longer retransmits the data packet to the first device and the second device, the data packet is retransmitted between the first device and the second device. In the embodiments shown in FIG. 9-FIG. 10, taking that the second device sends a response message to the data source device as an example for description.

In the following, the feasible implementation manner will be described with reference to FIG. 9-FIG. 10. In the embodiments shown in FIG. 9-FIG. 10, taking the maximum retransmission number of the data source device being 1 as an example for description.

Figure 9:
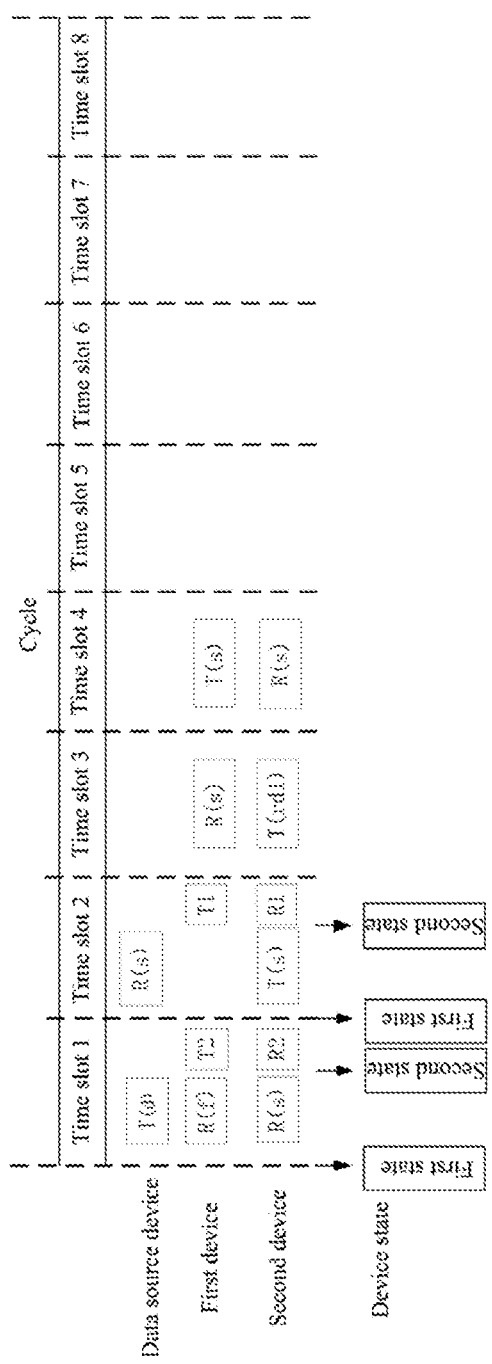
FIG. 9 is a schematic diagram of still another time slot provided by an embodiment of the present application.

FIG. 9 is a schematic diagram of still another time slot provided by an embodiment of the present application. The meaning of each character in FIG. 9 can be referred to Table 2, which will not be repeated here.

Figure 10:
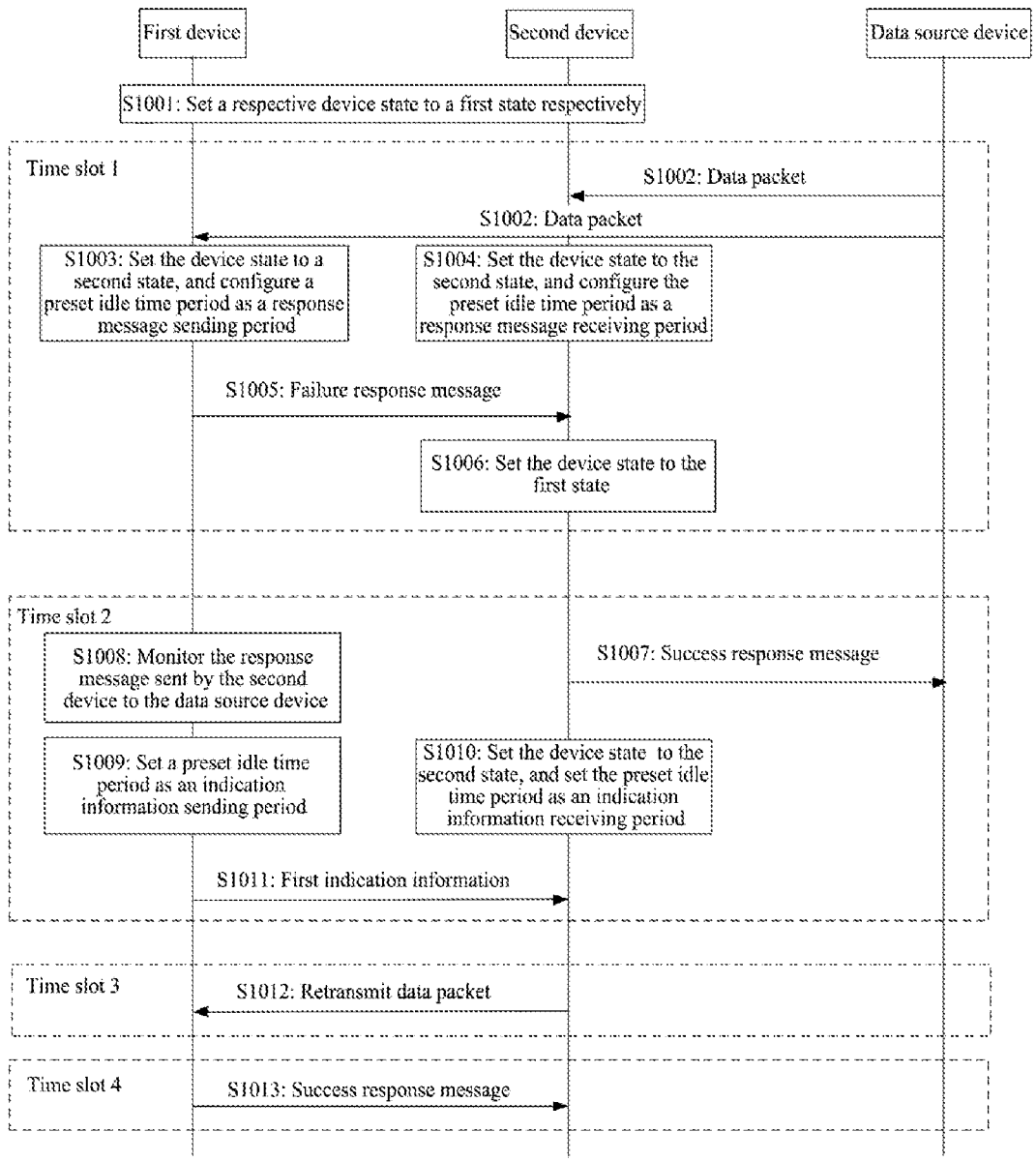
FIG. 10 is a schematic flowchart of yet another data transmission method provided by an embodiment of the present application.

FIG. 10 is a schematic flowchart of yet another data transmission method provided by an embodiment of the present application. Please refer to FIG. 10, the method may include:

S1001: a first device and a second device respectively set a respective device state to a first state before a time slot 1.

After the first device sets the device state to the first state, the first device communicates with the data source device. After the second device sets the device state to the first state, the second device communicates with the data source device.

S1002: a data source device sends a data packet to the first device and the second device in the time slot 1.

In an embodiment, the first device may receive the data packet successfully, or may not receive the data packet successfully. The second device may receive the data packet successfully, or may not receive the data packet successfully.

In the following, taking a case where the first device does not receive the data packet successfully and the second device receives the data packet successfully as an example.

S1003: the first device sets the device state to a second state, and configures a preset idle time period in the time slot 1 as a response message sending period.

S1004: the second device sets the device state to the second state, and configures the preset idle time period in the time slot 1 as a response message receiving period.

After the first device and the second device set the respective device state to the second state, the first device communicates with the second device.

S1005: the first device sends a failure response message to the second device in the preset idle time period of the time slot 1.

S1006: the second device sets the device state to the first state.

It should be noted that the execution of S1006 may be in the time slot 1 or in a time slot 2.

S1007: the second device sends a success response message to the data source device in a first time period in a time slot 2.

Since the second device receives the data packet in the time slot 1 successfully, that is, one of the first device and the second device receives the data packet sent by the data source device successfully. Therefore, the second device sends the success response message to the data source device.

S1008: the first device monitors the response message sent by the second device to the data source device in the first time period in the time slot 2.

S1009: the first device sets the preset idle time period in the time slot 2 as an indication information sending period.

S1010: the second device sets the device state to the second state, and sets the preset idle time period in the time slot 2 as an indication information receiving period.

S1011: the first device sends first indication information to the second device in the preset idle time period in the time slot 2.

Since the first device monitors that the second device sends the success response message to the data source device, the device state of the first device remains in the second state. Since the response message sent by the second device to the data source device is the success response message, the device state of the second device remains in the second state.

S1012: the second device sends the data packet to the first device in a time slot 3.

S1013: the first device sends a success response message to the second device in a time slot 4.

In the embodiments shown in FIG. 9-FIG. 10, the communication objects of the first device and the second device may be controlled by the device state. When one of the first device and the second device receives the data packet sent by the data source device, the first device and the second device may retransmit the data packet to each other, which improves the success probability of the first device and the second device to acquire data packets, thereby improving the reliability of data transmission.

Figure 11:
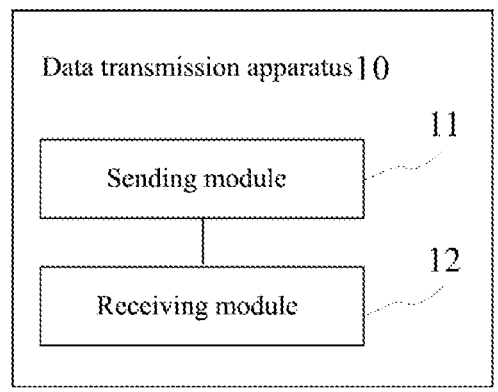
FIG. 11 is a schematic structural diagram of a data transmission apparatus provided by an embodiment of the present application.

FIG. 11 is a schematic structural diagram of a data transmission apparatus provided by an embodiment of the present application. The data transmission apparatus 10 may be applied to a first device. Please refer to FIG. 11, the data transmission apparatus 10 includes a sending module 11 and a receiving module 12, where, the sending module 11 is configured to send first indication information to a second device if the receiving module does not receive a data packet sent by a data source device in a first time slot successfully, where the first device and the second device are configured to receive the data packet sent by the data source device in a same time slot;

the receiving module 12 is configured to receive the data packet sent by the data source device or the second device when the second device receives the data packet sent by the data source device in the first time slot successfully;

the receiving module 12 is further configured to receive the data packet sent by the data source device when the second device does not receive the data packet sent by the data source device in the first time slot successfully.

The data transmission apparatus provided in the embodiment of the present application may execute the technical solutions shown in the above method embodiments, and its implementation principles and beneficial effects are similar, which will not be repeated here.

In a possible implementation manner, the receiving module 12 is specifically configured to:

receive the data packet sent by the second device if the first time slot is a time slot in which the data source device retransmits the data packet for the last time; and receive the data packet sent by the data source device or the second device if the first time slot is before the time slot in which the data source device retransmits the data packet for the last time.

In a possible implementation manner, the receiving module 12 is specifically configured to:

after the first device does not receive the data packet sent by the data source device in first time slot successfully, receive the data packet sent by the data source device if the first device sends a failure response message to the data source device; where the failure response message is used to indicate that the first device does not receive the data packet successfully; and after the first device does not receive the data packet sent by the data source device in first time slot successfully, receive the data packet sent by the second device if the first device or the second device sends a success response message to the data source device; where the success response message is used to indicate that at least one of the first device and the second device receives the data packet successfully.

In a possible implementation manner, the receiving module 12 is specifically configured to:

receive the data packet sent by the data source device if the first time slot is before a time slot in which the data source device retransmits the data packet for the last time.

Figure 12:
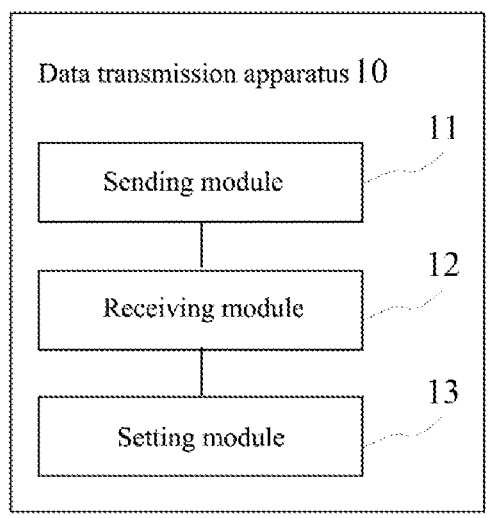
FIG. 12 is a schematic structural diagram of another data transmission apparatus provided by an embodiment of the present application.

FIG. 12 is a schematic structural diagram of another data transmission apparatus provided by an embodiment of the present application. Please refer to FIG. 12, the data transmission apparatus 10 further include a setting module 13, where, the setting module 13 is configured to set a device state of the first device to a first state, where the first state is used to indicate that the first device communicates with the data source device;

the receiving module 12 is specifically configured to receive the data packet sent by the data source device according to the first state.

In a possible implementation manner, the setting module 13 is specifically configured to:

set a communication address of the first device to an address of a device group, where the device group is a device group in which the first device and the second device are located.

In a possible implementation manner, the setting module 13 is further configured to set the device state to a second state, where the second state is used to indicate that the first device communicates with the second device;

the receiving module 12 is specifically configured to receive the data packet sent by the second device according to the second state.

In a possible implementation manner, the setting module 13 is specifically configured to:

set a communication address of the first device to a physical address of the first device.

In a possible implementation manner, the receiving module 12 is further configured to receive second indication information sent by the second device if the receiving module receives the data packet sent by the data source device in a first time slot successfully, and the second device does not receive the data packet sent by the data source in the first time slot successfully;

the sending module 11 is further configured to send the data packet to the second device if the first time slot is a time slot in which the data source device retransmits the data packet for the last time;

the sending module 11 is further configured to send the data packet to the second device if the first time slot is before the time slot in which the data source device retransmits the data packet for the last time, and the sending module or the second device sends a success response message to the data source device; where the success response message is used to indicate that at least one of the first device and the second device receives the data packet successfully.

In a possible implementation manner, the sending module 11 is specifically configured to:

send the first indication information to the second device in a preset idle time period in a second time slot, where the second time slot is a time slot after the first time slot and next to the first time slot.

In a possible implementation manner, the second time slot further includes a first time period, the preset idle time period is after the first time period, and the first time period is a time period for sending a response message to the data source device.

In a possible implementation manner, the first device and the second device are wireless transceiving devices.

In a possible implementation manner, the wireless transceiving device is a Bluetooth device.

In a possible implementation manner, the Bluetooth device is a Bluetooth audio device.

In a possible implementation manner, the Bluetooth audio device is a Bluetooth headset or a Bluetooth speaker.

The data transmission apparatus provided in the embodiment of the present application may execute the technical solutions shown in the above method embodiments, and its implementation principles and beneficial effects are similar, which will not be repeated here.

Figure 13:
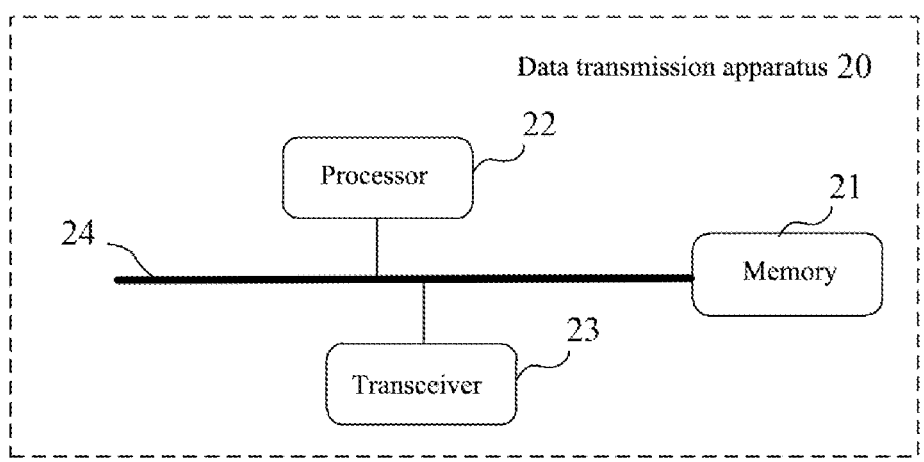
FIG. 13 is a schematic diagram of hardware structure of a data transmission apparatus provided by the present application.

FIG. 13 is a schematic diagram of hardware structure of a data transmission apparatus provided by the present application. Please refer to FIG. 13, the data transmission apparatus 20 includes: a memory 21, a processor 22, and a transceiver 23, where the memory 21 communicates with the processor 22; for example, the memory 21, the processor 22, and the transceiver 23 may communicate via a communication bus 24, and the memory 21 is configured to store computer program, the processor 22 executes the computer program to implement the above communication method. For example, the processor 22 executes the related steps executed by the second device in the above method embodiments.

In an embodiment, the above processor may be a central processing unit (Central Processing Unit, CPU), or may be other general-purpose processor, digital signal processor (Digital Signal Processors, DSP), and application specific integrated circuit (Application Specific Integrated Circuits, ASIC), etc. The general-purpose processor may be a microprocessor, or the processor may also be any conventional processor, etc. The steps in the data transmission method embodiments disclosed in the present application can be directly embodied as being executed by a hardware processor, or executed by a combination of hardware and software modules in the processor.

An embodiment of the present application also provides a communication system, including the first device, the second device, and the data source device mentioned above. The data source device is configured to send the data packet to the first device and the second device. The data packet can also be retransmitted between the first device and the second device. The interaction process between the first device, the second device, and the data source device may refer to the above method embodiments, which will not be repeated here.

An embodiment of the present application also provides a computer-readable storage medium, including a computer program stored thereon, where when the program is executed by a processor, the data transmission method described in any of the above method embodiments is implemented.

All or part of the steps in the above method embodiments may be implemented by hardware associated with program instructions. The aforementioned program may be stored in a readable memory. When the program is executed, it executes the steps that include the above method embodiments; and the aforementioned memory (storage medium) includes: a read-only memory (ROM), a RAM, a flash memory, a hard disk, Solid state drive, a magnetic tape, a floppy disk, an optical disc and any combination thereof.

The embodiments of the present application are described with reference to the flowcharts and/or block diagrams of the methods, devices (systems), and computer program products according to the embodiments of the present application. It should be understood that each process and/or block in the flowchart and/or block diagram, and the combination of processes and/or blocks in the flowchart and/or block diagram may be realized by computer program instructions. These computer program instructions may be provided to a processing unit of a general-purpose computer, a special-purpose computer, an embedded processor, or other programmable data processing device to generate a machine, so that the instructions executed by the processing unit of the computer or other programmable data processing device generate an apparatus that realizes the functions specified in one process or multiple processes in the flowchart and/or one block or multiple blocks in the block diagram.

These computer program instructions may also be stored in a computer-readable memory that may direct a computer or other programmable data processing device to work in a specific manner, so that the instructions stored in the computer-readable memory produce a manufacture including an instruction apparatus. The instruction apparatus implements the functions specified in one process or multiple processes in the flowchart and/or one block or multiple blocks in the block diagram.

These computer program instructions may also be loaded on a computer or other programmable data processing device, so that a series of operation steps are executed on the computer or other programmable device to produce computer-implemented processing, thereby the instructions executed on the computer or other programmable device provide steps for implementing functions specified in a flow or multiple flows in the flowchart and/or a block or multiple blocks in the block diagram.

Obviously, those skilled in the art can make various changes and modifications to the embodiments of the present application without departing from the spirit and scope of the present application. In this way, if these modifications and variations of the embodiments of the present application fall within the scope of the claims of the present application and their equivalent technologies, the present application is also intended to include these modifications and variations.

In the present application, the term "including" and its variations may refer to non-limiting inclusion; the term "or" and its variations may refer to "and/or". The terms "first", "second", etc. in the present application are used to distinguish similar objects, and are not necessarily used to describe a specific sequence or order. In the present application, "plurality" means two or more. "And/or" describes the association relationship of the associated object, indicating that there may be three types of relationships, for example, A and/or B, which means: A exists alone, A and B exist at the same time, and B exists alone. The character "/" generally indicates that the associated objects before and after are in an "or" relationship.

What is claimed is:

1. A data transmission method, comprising:
sending, by a first device, first indication information to a second device and receiving, by the first device, a data packet sent by a data source device or the second device in a condition that the first device does not receive the data packet sent by the data source device in a first time slot successfully and the second device receives the data packet sent by the data source device in the first time slot successfully, wherein the first device and the second device are configured to receive the data packet sent by the data source device in a same time slot; and
sending, by the first device, the first indication information to the second device and receiving, by the first device, the data packet sent by the data source device in a condition that the first device does not receive the data packet sent by the data source device in the first time slot successfully and the second device does not receive the data packet sent by the data source device in the first time slot successfully;
wherein the receiving, by the first device, the data packet sent by the data source device or the second device in the condition that the first device does not receive the data packet sent by the data source device in a first time slot successfully and the second device receives the data packet sent by the data source device in the first time slot successfully, comprises:
receiving, by the first device, the data packet sent by the second device in a condition that the first time slot is a time slot in which the data source device retransmits the data packet for the last time; and
receiving, by the first device, the data packet sent by the data source device or the second device in a condition that the first time slot is before the time slot in which the data source device retransmits the data packet for the last time.

2. The method according to claim 1, wherein the receiving, by the first device, the data packet sent by the data source device or the second device in the condition that the first time slot is before the time slot in which the data source device retransmits the data packet for the last time, comprises:
after the first device does not receive the data packet sent by the data source device in the first time slot successfully, receiving, by the first device, the data packet sent by the data source device in a condition that the first device sends a failure response message to the data source device; wherein the failure response message is used to indicate that the first device does not receive the data packet successfully; and
after the first device does not receive the data packet sent by the data source device in the first time slot successfully, receiving, by the first device, the data packet sent by the second device in a condition that the first device or the second device sends a success response message to the data source device; wherein the success response message is used to indicate that at least one of the first device and the second device receives the data packet successfully.

3. The method according to claim 1, wherein the receiving, by the first device, the data packet sent by the data source device in the condition that the first device does not receive the data packet sent by the data source device in the first time slot successfully and the second device does not receive the data packet sent by the data source device in the first time slot successfully, comprises:
receiving, by the first device, the data packet sent by the data source device in a condition that the first time slot is before a time slot in which the data source device retransmits the data packet for the last time.

4. The method according to claim 1, wherein the receiving, by the first device, the data packet sent by the data source device, comprises:
setting, by the first device, a device state to a first state, wherein the first state is used to indicate that the first device communicates with the data source device; and
receiving, by the first device, the data packet sent by the data source device according to the first state; and
wherein the setting, by the first device, a device state to the first state, comprises:
setting, by the first device, a communication address of the first device to an address of a device group, wherein the device group is a device group in which the first device and the second device are located.

5. The method according to claim 1, wherein the receiving, by the first device, the data packet sent by the second device, comprises:
setting, by the first device, a device state to a second state, wherein the second state is used to indicate that the first device communicates with the second device; and
receiving, by the first device, the data packet sent by the second device according to the second state; and
wherein the setting, by the first device, a device state to the second state, comprises:
setting, by the first device, a communication address of the first device to a physical address of the first device.

6. The method according to claim 1, wherein in a condition that the first device receives the data packet sent by the data source device in the first time slot successfully, and the second device does not receive the data packet sent by the data source device in the first time slot successfully; the method further comprises:
- receiving, by the first device, second indication information sent by the second device;
- sending, by the first device, the data packet to the second device in a condition that the first time slot is a time slot in which the data source device retransmits the data packet for the last time; and
- sending, by the first device, the data packet to the second device in a condition that the first time slot is before the time slot in which the data source device retransmits the data packet for the last time, and the first device or the second device sends a success response message to the data source device; wherein the success response message is used to indicate that at least one of the first device and the second device receives the data packet successfully.

7. The method according to claim 1, wherein the sending, by a first device, the first indication information to a second device, comprises:
- sending, by the first device, the first indication information to the second device in a preset idle time period in a second time slot, wherein the second time slot is a time slot after the first time slot and next to the first time slot; and
- wherein the second time slot further comprises a first time period, the preset idle time period is after the first time period, and the first time period is a time period for sending a response message to the data source device.

8. The method according to claim 1, wherein the first device and the second device are wireless transceiving devices;
- wherein the wireless transceiving device is a Bluetooth device;
- wherein the Bluetooth device is a Bluetooth audio device;
- wherein the Bluetooth audio device is a Bluetooth headset or a Bluetooth speaker.

9. A data transmission apparatus, which is applied to a first device, the data transmission apparatus comprises:
- at least one processor;
- a transceiver; and
- a memory communicatively connected to the at least one processor; wherein,
- the memory stores an instruction executable by the at least one processor, and the instruction is executed by the at least one processor, the at least one processor is configured to:
- control the transceiver to send first indication information to a second device and receive a data packet sent by a data source device or the second device in a condition that the transceiver does not receive the data packet sent by the data source device in a first time slot successfully and the second device receives the data packet sent by the data source device in the first time slot successfully, wherein the first device and the second device are configured to receive the data packet sent by the data source device in a same time slot;
- control the transceiver to send the first indication information to the second device and receive the data packet sent by the data source device in a condition that the first device does not receive the data packet sent by the data source device in the first time slot successfully and the second device does not receive the data packet sent by the data source device in the first time slot successfully;

wherein the at least one processor is specifically configured to:
- control the transceiver to receive the data packet sent by the second device in a condition that the first time slot is a time slot in which the data source device retransmits the data packet for the last time; and
- control the transceiver to receive the data packet sent by the data source device or the second device in a condition that the first time slot is before the time slot in which the data source device retransmits the data packet for the last time.

10. The apparatus according to claim 9, wherein the at least one processor is specifically configured to:
- after the first device does not receive the data packet sent by the data source device in the first time slot successfully, control the transceiver to receive the data packet sent by the data source device in a condition that the first device sends a failure response message to the data source device; wherein the failure response message is used to indicate that the first device does not receive the data packet successfully; and
- after the first device does not receive the data packet sent by the data source device in the first time slot successfully, control the transceiver to receive the data packet sent by the second device in a condition that the first device or the second device sends a success response message to the data source device; wherein the success response message is used to indicate that at least one of the first device and the second device receives the data packet successfully.

11. The apparatus according to claim 9, wherein the at least one processor is specifically configured to:
- control the transceiver to receive the data packet sent by the data source device in a condition that the first time slot is before a time slot in which the data source device retransmits the data packet for the last time.

12. The apparatus according to claim 9, wherein the at least one processor is configured to:
- set a device state of the first device to a first state, wherein the first state is used to indicate that the first device communicates with the data source device;
- control the transceiver to receive the data packet sent by the data source device according to the first state; and
- set a communication address of the first device to an address of a device group, wherein the device group is a device group in which the first device and the second device are located.

13. The apparatus according to claim 12, wherein the at least one processor is further configured to set the device state to a second state, wherein the second state is used to indicate that the first device communicates with the second device;
- control the transceiver to receive the data packet sent by the second device according to the second state;
- set a communication address of the first device to a physical address of the first device.

14. The apparatus according to claim 9, wherein the at least one processor is further configured to control the transceiver to receive second indication information sent by the second device in a condition that the transceiver receives the data packet sent by the data source device in a first time slot successfully, and the second device does not receive the data packet sent by the data source in the first time slot successfully;
- control the transceiver to send the data packet to the second device in a condition that the first time slot is a time slot in which the data source device retransmits the data packet for the last time;

control the transceiver to send the data packet to the second device in a condition that the first time slot is before the time slot in which the data source device retransmits the data packet for the last time, and the transceiver or the second device sends a success response message to the data source device; wherein the success response message is used to indicate that at least one of the first device and the second device receives the data packet successfully.

15. The apparatus according to claim 9, wherein the at least one processor is specifically configured to:

control the transceiver to send the first indication information to the second device in a preset idle time period in a second time slot, wherein the second time slot is a time slot after the first time slot and next to the first time slot.

16. The apparatus according to claim 15, wherein the second time slot further comprises a first time period, the preset idle time period is after the first time period, and the first time period is a time period for sending a response message to the data source device.

17. The apparatus according to claim 9, wherein the first device and the second device are wireless transceiving devices;

wherein the wireless transceiving device is a Bluetooth device;

wherein the Bluetooth device is a Bluetooth audio device;

wherein the Bluetooth audio device is a Bluetooth headset or a Bluetooth speaker.

18. A non-transitory computer-readable storage medium, comprising: a computer program stored thereon, wherein when the computer program is executed by a processor, the processor is configured to:

send first indication information to a second device and receive a data packet sent by a data source device or the second device in a condition that the processor does not receive the data packet sent by the data source device in a first time slot successfully and the second device receives the data packet sent by the data source device in the first time slot successfully, wherein the first device and the second device are configured to receive the data packet sent by the data source device in a same time slot;

send the first indication information to the second device and receive the data packet sent by the data source device in a condition that the first device does not receive the data packet sent by the data source device in the first time slot successfully and the second device does not receive the data packet sent by the data source device in the first time slot successfully;

wherein the processor is specifically configured to:

receive the data packet sent by the second device in a condition that the first time slot is a time slot in which the data source device retransmits the data packet for the last time; and receive the data packet sent by the data source device or the second device in a condition that the first time slot is before the time slot in which the data source device retransmits the data packet for the last time.

\* \* \* \* \*